(12) United States Patent
Rooney et al.

(10) Patent No.: US 6,597,992 B2
(45) Date of Patent: Jul. 22, 2003

(54) SOIL AND TOPOGRAPHY SURVEYING

(75) Inventors: Daniel James Rooney, Madison, WI (US); Marek Dudka, Sun Prairie, WI (US); Mark Andrew Cheyne, Milwaukee, WI (US)

(73) Assignee: Soil and Topography Information, LLC, WI (US)

( * ) Notice: Subject to any disclaimer, the term of this patent is extended or adjusted under 35 U.S.C. 154(b) by 9 days.

(21) Appl. No.: 09/998,863

(22) Filed: Nov. 1, 2001

(65) Prior Publication Data

US 2003/0083819 A1 May 1, 2003

(51) Int. Cl.$^7$ .......................... G06F 17/60; G05D 11/00
(52) U.S. Cl. .................. 702/5; 702/2; 700/283
(58) Field of Search .......................... 702/5, 2, 47, 50; 700/283

(56) References Cited

U.S. PATENT DOCUMENTS

| | | | |
|---|---|---|---|
| 4,219,776 A | 8/1980 | Arulananadan | 324/323 |
| 4,403,312 A | 9/1983 | Thomason | 367/56 |
| 4,712,424 A | 12/1987 | Herron | 73/152 |
| 4,722,220 A | 2/1988 | Herron | 73/152 |
| 4,806,153 A | 2/1989 | Sakai et al. | 73/151 |
| 4,809,790 A | 3/1989 | Manchak, Jr. | 175/17 |
| 4,930,110 A | 5/1990 | Bremner et al. | 367/56 |
| 4,973,970 A | 11/1990 | Reeser | 342/357 |
| 4,996,421 A | 2/1991 | Rai et al. | 250/255 |
| 5,010,776 A | 4/1991 | Lucero et al. | 73/863.23 |
| 5,063,519 A | * 11/1991 | Zison | 702/47 |
| 5,150,622 A | 9/1992 | Vollweiler | 73/864.74 |
| 5,151,870 A | 9/1992 | Beebe et al. | 702/168 |
| 5,246,862 A | 9/1993 | Grey et al. | 436/28 |
| 5,282,389 A | 2/1994 | Faivre et al. | 73/861.73 |
| 5,316,950 A | 5/1994 | Apitz et al. | 436/28 |
| 5,351,532 A | 10/1994 | Hager | 73/153 |
| 5,355,815 A | 10/1994 | Monson | 111/200 |
| 5,359,511 A | 10/1994 | Schroeder et al. | 433/75 |
| 5,375,663 A | 12/1994 | Teach | 172/4.5 |
| 5,383,114 A | 1/1995 | Chambers | 702/16 |
| 5,408,182 A | 4/1995 | Stolarczyk et al. | 324/338 |
| 5,410,252 A | 4/1995 | Potter et al. | 324/345 |
| 5,416,321 A | 5/1995 | Sebastian et al. | 250/288 |
| 5,435,176 A | 7/1995 | Manchak, III | 73/151 |
| 5,435,399 A | 7/1995 | Peterson et al. | 175/20 |
| 5,467,271 A | 11/1995 | Abel et al. | 702/5 |
| 5,493,494 A | 2/1996 | Henderson | 701/50 |
| 5,497,091 A | 3/1996 | Bratton et al. | 324/348 |
| 5,519,609 A | 5/1996 | Kuchenrither et al. | 702/5 |
| 5,539,704 A | 7/1996 | Doyen et al. | 367/73 |

(List continued on next page.)

FOREIGN PATENT DOCUMENTS

WO   WO 93/23741   11/1993

OTHER PUBLICATIONS

Rooney et al., "A Profile Cone Penetrometer for Mapping Soil Horizons", *Soil Science Society of America Journal*, vol. 64, No. 6, Nov.–Dec. 2000, pp. 2136–2139, Madison, Wisconsin.

Primary Examiner—John Barlow
Assistant Examiner—Victor J. Taylor
(74) Attorney, Agent, or Firm—Fish & Richardson P.C.

(57) ABSTRACT

Methods of characterizing subsurface conditions in a selected geographic region previously associated as a whole with a specific subsurface material characteristic reference profile such as from a USDA-NRCS soil survey. The method includes deploying a sensing tool at selected positions within the geographic region to determine a depth-referenced subsurface material characteristic such as soil type or strata, comparing the determined subsurface material characteristic to the subsurface material characteristic reference profile associated with the geographic region to determine a correlation between the subsurface material characteristic reference profile and the depth-referenced subsurface material characteristic, and then deciding whether to deploy the tool at another position, and at what optimum position to deploy the tool, by considering the correlation.

46 Claims, 8 Drawing Sheets

U.S. PATENT DOCUMENTS

| | | | | |
|---|---|---|---|---|
| 5,553,407 A | | 9/1996 | Stump | 37/348 |
| 5,563,949 A | | 10/1996 | Bahorich et al. | 702/16 |
| 5,631,658 A | | 5/1997 | Gudat et al. | 342/457 |
| 5,646,844 A | | 7/1997 | Gudat et al. | 701/208 |
| 5,652,519 A | | 7/1997 | Warren et al. | 324/339 |
| 5,659,985 A | | 8/1997 | Stump | 37/348 |
| 5,668,719 A | * | 9/1997 | Bobrov et al. | 702/2 |
| 5,673,050 A | | 9/1997 | Moussally et al. | 342/22 |
| 5,681,982 A | | 10/1997 | Stoll et al. | 73/12.13 |
| 5,684,476 A | | 11/1997 | Anderson | 340/988 |
| 5,687,093 A | | 11/1997 | Long et al. | 703/1 |
| 5,704,142 A | | 1/1998 | Stump | 37/348 |
| 5,721,679 A | | 2/1998 | Monson | 701/207 |
| 5,751,576 A | | 5/1998 | Monson | 700/83 |
| 5,754,137 A | | 5/1998 | Dürrstein | 342/357 |
| 5,771,169 A | | 6/1998 | Wendte | 702/5 |
| 5,798,940 A | | 8/1998 | Bratton et al. | 700/267 |
| 5,809,440 A | | 9/1998 | Beck et al. | 701/50 |
| 5,813,798 A | | 9/1998 | Whiffen | 405/52 |
| 5,835,883 A | | 11/1998 | Neff et al. | 702/7 |
| 5,838,564 A | | 11/1998 | Bahorich et al. | 702/16 |
| 5,838,634 A | | 11/1998 | Jones et al. | 367/73 |
| 5,841,282 A | | 11/1998 | Christy et al. | 324/347 |
| 5,862,512 A | | 1/1999 | Voorhees et al. | 702/2 |
| 5,870,689 A | | 2/1999 | Hale et al. | 702/5 |
| 5,878,371 A | | 3/1999 | Hale et al. | 702/2 |
| 5,884,224 A | | 3/1999 | McNabb et al. | 702/2 |
| 5,887,491 A | | 3/1999 | Monson et al. | 74/864.74 |
| 5,892,362 A | | 4/1999 | Warren et al. | 324/339 |
| 5,892,732 A | | 4/1999 | Gersztenkorn | 229/116.5 |
| 5,902,343 A | | 5/1999 | Hale et al. | 701/50 |
| 5,905,036 A | | 5/1999 | Pope et al. | 435/262 |
| 5,907,111 A | | 5/1999 | Josten et al. | 73/866.5 |
| 5,919,242 A | | 7/1999 | Greatline et al. | 701/50 |
| 5,923,270 A | | 7/1999 | Sampo et al. | 340/988 |
| 5,930,730 A | | 7/1999 | Marfurt et al. | 702/16 |
| 5,938,709 A | | 8/1999 | Hale et al. | 701/50 |
| 5,955,973 A | | 9/1999 | Anderson | 340/988 |
| 5,961,573 A | | 10/1999 | Hale et al. | 701/214 |
| 5,978,723 A | | 11/1999 | Hale et al. | 701/50 |
| 5,987,383 A | | 11/1999 | Keller et al. | 701/213 |
| 5,991,687 A | | 11/1999 | Hale et al. | 701/207 |
| 5,995,894 A | | 11/1999 | Wendte | 701/50 |
| 5,995,895 A | | 11/1999 | Watt et al. | 701/50 |
| 5,995,906 A | | 11/1999 | Doyen et al. | 702/16 |
| 5,996,702 A | | 12/1999 | Hall | 172/4.5 |
| 6,016,713 A | | 1/2000 | Hale | 73/864.45 |
| 6,029,106 A | | 2/2000 | Hale et al. | 701/50 |
| 6,041,582 A | | 3/2000 | Tiede et al. | 56/10.2 A |
| 6,044,316 A | | 3/2000 | Mullins | 701/50 |
| 6,044,324 A | | 3/2000 | Boerhave et al. | 702/5 |
| 6,047,227 A | | 4/2000 | Henderson et al. | 706/20 |
| 6,061,618 A | | 5/2000 | Hale et al. | 701/50 |
| 6,085,135 A | | 7/2000 | Steckel | 701/50 |
| 6,092,026 A | | 7/2000 | Bahorich et al. | 702/16 |
| 6,119,069 A | * | 9/2000 | McCauley | 702/5 |
| 6,119,376 A | | 9/2000 | Stump | 37/348 |
| 6,119,531 A | | 9/2000 | Wendte et al. | 73/863.52 |
| 6,131,069 A | | 10/2000 | Böttinger | 702/5 |
| 6,141,614 A | | 10/2000 | Janzen et al. | 701/50 |
| 6,160,902 A | | 12/2000 | Dickson et al. | 701/50 |
| 6,164,223 A | | 12/2000 | Eriksson | 111/200 |
| 6,191,732 B1 | | 2/2001 | Carlson et al. | 342/357.06 |
| 6,195,604 B1 | | 2/2001 | Moore et al. | 701/50 |
| 6,195,922 B1 | | 3/2001 | Stump | 37/348 |
| 6,199,000 B1 | | 3/2001 | Keller et al. | 701/50 |
| 6,236,907 B1 | * | 5/2001 | Hauwiller et al. | 700/283 |
| 6,236,924 B1 | | 5/2001 | Motz et al. | 701/50 |
| 6,249,746 B1 | | 6/2001 | Neff et al. | 702/16 |
| 6,266,595 B1 | | 7/2001 | Greatline et al. | 701/50 |
| 6,349,775 B1 | | 2/2002 | van der Lely et al. | 172/2 |
| 2001/0036295 A1 | | 11/2001 | Hendrickson et al. | 382/110 |
| 2002/0035431 A1 | | 3/2002 | Ell | 702/5 |

* cited by examiner

SOIL AND TOPOGRAPHY SURVEYING

FIELD OF THE INVENTION

This invention relates to methods of soil and topography surveying and mapping, and more particularly to guiding the location of soil sampling and sensor testing in areas for which pre-existing survey data of various types are available.

BACKGROUND OF THE INVENTION

Soil information is publicly available in the United States as air photos overlaid with closed boundaries or polygons each enclosing a geographic region or "soil map unit" labeled with a number corresponding to a specific subsurface material characteristic reference profile identified in a United States Department of Agriculture-Natural Resource Conservation Service (USDA-NRCS) Soil Survey as a soil series description. Such soil surveys are presently available for over ninety percent of the geographic area of the United States, and other types of soil characterization maps are also available, both for the United States and other geographic regions. In any given field there may be several polygons, each of which bounds a numbered soil map unit. On average, there may be about 5.5 polygons per any 100 acre area. As the number of the soil map unit corresponds to a particular characteristic soil type and profile, many soil map units in a particular area may have identical labels. A table is used in the survey to link each number to a soil series name, and for each soil series name, the Soil Survey contains a text description of a representative soil profile. For example, the listing for the "Drummer Series" corresponding to soil map unit "152" is as follows:

The Drummer series consists of deep, nearly level, poorly drained soils. These soils are in drainageways and in broad, flat areas on uplands. They formed in silty material and in the underlying stratified loamy material.

In a representative profile the surface layer is black and very dark gray silty clay loam about 18 inches thick. The subsoil, about 32 inches thick, is olive-gray and gray to light-gray silty clay loam mottled with strong brown. The underlying material is gray and strong-brown sandy clay loam and silt loam.

These soils are moderately permeable and have high available water capacity. Surface drainage and internal drainage are very slow, and when wet, the soils have low stability. The soils are subject to frequent waterlogging and flooding or ponding during periods of run-off. Seasonally the water table is at a depth of less than 2 feet.

These soils are well suited to row crops if they are adequately tile drained. Frequent waterlogging and potential for flooding or ponding are sever limitations for most other uses.

Representative profile of Drummer silty clay loam, 480 feet south and 75 feet west of the N.E. corner of SE1/4 sec. 24, T. 39 N., R. 3 E.

A11—0 to 11 inches, black (10YR 2/1) silty clay loam; moderate, fine and very fine, granular structure; friable; neutral; gradual, smooth boundary.

A12—11 to 18 inches, black (10YR 2/1) and very dark gray (10YR 3/1) silty clay loam; weak, fine, subangular blocky structure parting to moderate, fine, granular; friable; neutral; gradual, smooth boundary.

B21g—18 to 29 inches, olive-gray (5Y 5/2) silty clay loam; few, fine, faint, strong-brown (7.5YR 5/6) mottles; moderate, fine, prismatic structure parting to moderate, fine, subangular blocky; firm; neutral; gradual, smooth boundary.

B22g—29 to 50 inches, gray to light-gray (5Y 6/1) and strong-brown (7.5YR 5/6) silty clay loam; moderate, medium, prismatic structure; firm; neutral; abrupt, smooth boundary.

HC1g—50 to 60 inches, strong-brown (7.5YR 5/8) and gray to light-gray (5Y 6/1) sandy clay loam; massive; friable; mildly alkaline; abrupt, smooth boundary.

HC2g—60 to 78 inches, gray to light-gray (5Y 6/1) and some pinkish-gray (5YR 6/2), brown to dark-brown (7.5YR 4/4) and gray to light-gray (7.5YR 6/0) silt loam; massive; friable; moderately alkaline.

The A horizon ranges from 8 to 20 inches in thickness. The B horizon ranges from 15 to 40 inches in thickness and from silty clay loam to clay loam in texture in the lower part. It is neutral to mildly alkaline. The C horizon ranges from loam to silt loam to sandy clay loam.

Drummer soils are associated with Peotone and Flanagan soils. They have a thinner A horizon than Peotone soils and are more poorly drained than Flanagan soils.

This text-based description of the soil series includes textual soil log information from a representative profile located somewhere in the United States. This soil type and profile information is useful to estimate the soil characteristics of any soil map unit of that soil series (in this case, the Drummer Series number 152) located anywhere in the United States or elsewhere.

These representative profile descriptions typically range from the surface down to about 60 to 80 inches and contain descriptions of horizons or soil layers. Information on horizon depth and thickness and soil attributes is given for each typical soil horizon. This data is at best a representation of what that particular type of soil might look like on average in a typical situation. Thus, at any given location there will be differences between this characteristic information and actual boundary layer depth and thickness, and to some extent the soil content and type within each boundary or horizon. In order to better classify soils for precision management applications, it is sometimes necessary to characterize the actual depth, thickness and content of a particular soil map unit within a field, and all other soil map units contained within that field.

The USDA-NRCS polygons are available currently in digital format for about sixty percent of the United States. In these cases, the soil map unit boundaries and their landscape position can be downloaded from a database accessible through the Internet, or from a CD-Rom or other data storage device. In some cases, the air photo is also available in digital format. However, the text descriptions of the soil series are currently only available in text format that can be read and viewed by an individual, but not readily compared digitally to sample or sensor data. Also, as the description associated with a particular soil series is almost always from a representative soil log taken at a location far from the actual field polygon that is being mapped, various inaccuracies can develop.

The USDA-NRCS is responsible for mapping soils in the United States at a scale referred to as a Second Order Survey. This is typically in a scale range from 1:24,000 to 1:60,000. It is generally understood that such rough scales are not particularly useful for high precision applications, such as agriculture, wetland mapping, construction, watershed, golf course design maintenance, archaeological mapping, environmental site assessments, and such. Methods are needed for more accurately characterizing subsurface conditions in geographic regions previously associated as a whole with a specific subsurface material characteristic reference profile in a USDA-NRCS survey or the like, to make such database information more useful for such precision applications.

The depth and thickness of soil horizons and their properties can vary immensely within a landscape, and even within a given field. If a critical soil property, such as nutrient and water holding capacity or carbon content, is to be assessed within a given field or area, then it is critical that the vertical and horizontal distribution of such properties be determined accurately. When a soil core is collected, the number of sections analyzed in the sample limits the vertical resolution of the soil property assessment at that location. This is due primarily to the high cost and time expenditure associated with soil sample collection, preparation, analysis, and recording procedures. Typically, only a few locations across a landscape are chosen for core sampling, and only a few sample sections are removed from each core for analysis. This limited vertical soil information results in errors when attempting to model the spatial distribution and volume of soil properties across a landscape.

SUMMARY OF THE INVENTION

According to one aspect of the invention, a method is provided for characterizing subsurface conditions in a selected geographic region previously associated as a whole with a specific subsurface material characteristic reference profile. The method includes deploying a sensing tool at a selected position within the geographic region, with the tool constructed to be responsive to a selected subsurface material attribute, and determining, from a signal received from the deployed tool, a depth-referenced subsurface material characteristic at the selected position. The determined subsurface material characteristic is compared to the subsurface material characteristic reference profile associated with the geographic region to determine a correlation between the subsurface material characteristic reference profile and the depth-referenced subsurface material characteristic as determined from the signal received from the deployed tool.

In one approach, the method also includes deciding whether to deploy the tool at another position within said geographic region by considering the correlation determined from said selected position.

In some embodiments, the geographic region corresponds to one bounded area of a patchwork of such bounded areas on a map, each bounded area having an associated subsurface material characteristic reference profile. For example, in a particularly useful method for surveying areas in the United States, the geographic region comprises an individual Soil Map Unit as outlined on an USDA-NRCS Soil Survey map and referenced to the subsurface material characteristic reference profile by the USDA-NRCS Soil Survey map.

In some cases, the depth-referenced subsurface material characteristic comprises a digital log of a soil property as a function of depth. In some such cases, comparing the determined subsurface material characteristic to the subsurface material reference characteristic profile associated with the geographic region may include comparing a soil layer boundary depth, as determined from the soil property log, with a reference layer boundary depth as determined from the subsurface material reference characteristic profile.

For some applications, the subsurface material reference characteristic profile comprises a digital reference profile log containing at least about 10 discrete, depth-referenced data points, with the correlation comprising a computed numerical value indicative of degree of similarity between the digital soil property log and the digital reference profile log.

Comparing the determined subsurface material characteristic to the subsurface material reference characteristic profile associated with the geographic region includes, in some cases, comparing soil texture at a selected depth, as determined from the determined subsurface material characteristic, with a reference texture as determined from the subsurface material reference characteristic profile.

For many particularly important applications, deploying the tool includes penetrating soil with the tool to a depth of at least 6 inches, preferably at least 24 inches.

The method preferably includes geo-referencing the selected position to a coordinate system with a Global Positioning System, such as with a GPS transceiver associated with a tool deployment system.

In some embodiments, the depth-referenced subsurface material characteristic comprises a log of data taken at multiple depths at the selected position.

The tool, in some cases, is responsive to light reflected from adjacent subsurface material in situ. In such cases, determining the depth-referenced subsurface material characteristic preferably includes generating a depth-referenced, rastered image of the subsurface material. A series of images of adjacent subsurface materials may be collected and digitally processed as the tool is forced through the subsurface materials, for example.

In some applications, the method also includes traversing the geographic region while obtaining landscape position and elevation measurements; combining the position and elevation measurements to form a digital elevation model; adjusting a depth reference of the subsurface material characteristic determined at each of several test locations in accordance with the digital elevation model; and then combining the depth reference-adjusted subsurface material characteristics to form a three-dimensional subsurface model of the material characteristic.

In some scenarios, the depth-referenced subsurface material characteristic comprises multiple, discrete data points obtained at selected depths at the selected position. The selected depths may be chosen to correspond to soil layers identified in the subsurface material characteristic reference profile associated with the geographic region, for example. The discrete data points are, in some cases, spaced apart in elevation according to soil layer thickness included in the subsurface material characteristic reference profile.

In some cases, the method includes selecting a next tool deployment location within the selected geographic region on a basis of the correlation between the subsurface material characteristic reference profile and the depth-referenced subsurface material characteristic.

The method also includes, in some embodiments, deploying a subsurface tool at the next tool deployment location; determining, from a signal received from the deployed subsurface tool, a second depth-referenced soil characteristic; comparing the second depth-referenced soil characteristic to the subsurface soil characteristic profile associated with the geographic region to determine another correlation, between the soil characteristic reference profile and the second depth-referenced soil characteristic; and then selecting a third tool deployment location within the selected geographic region on a basis of both determined correlations.

In some embodiments, the soil attribute sensing tool is deployed in at least three initial positions within the geographic region, to determine a depth-referenced soil characteristic at each of the initial positions. The determined soil characteristics are then compared to each other and to the subsurface soil characteristic reference profile associated with the geographic region to determine a correlation between the depth-referenced soil characteristics at the initial positions, and between the depth-referenced soil characteristics and the soil characteristic reference profile. Preferably, the next tool deployment location within the selected geographic region is selected on a basis of the correlation between the depth-referenced soil characteristics at the initial positions.

The method includes, in some cases, generating a three-dimensional model of the soil characteristic from depth-referenced soil characteristics obtained at multiple positions within the geographic region. Preferably, this model is updated throughout the data collection process as data is generated at additional locations within the geographic region, with the model and/or a confidence value or error estimate associated with the model serving as a basis for determining additional test requirements. Th three-dimensional model may be created digitally using punctual Kriging estimation techniques, for example.

Another aspect of the invention features a method of characterizing subsurface conditions in a selected geographic region previously surveyed to identify discrete zones within the region corresponding to a reference soil series having an associated description of soil layers corresponding to the soil series and soil properties common to each layer. The method includes selecting a test position in each identified zone; deploying a sensing tool at the selected position within the geographic region, with the tool constructed to be responsive to a selected subsurface material attribute; and then determining, from a signal received from the deployed tool, a subsurface material characteristic at multiple, discrete depths corresponding to layer positions described in the reference soil series description.

The method includes, in some applications, comparing the determined subsurface material characteristic to soil layer properties listed in the reference soil series description.

In some particularly useful embodiments, the soil zones correspond to individual Soil Map Units as outlined on an USDA-NRCS Soil Survey map.

According to yet another aspect of the invention, a method of generating first order survey information in an individual Soil Map Unit, as outlined in a map of a USDA-NRCS Soil Survey that establishes an SMU Inclusion Percentage associated with the Soil Map Unit, is provided. The method includes selecting an initial number of positions for tool deployment within the Soil Map Unit, the initial number of selected surface positions being determined as a function of the associated SMU Inclusion Percentage; deploying a subsurface attribute sensing tool to generate subsurface characteristic logs, based on signals received from the deployed tool, at the selected surface positions; identifying a soil boundary layer feature common to the generated subsurface characteristic logs; and calculating an expected depth of the soil boundary layer feature at further surface positions within the bounded area as a function of depth of the soil boundary layer feature in the three selected surface positions and a spatial relationship between the selected surface positions and each further surface position.

The method also includes, in some instances, determining, from a signal received from the deployed subsurface tool, a depth-referenced soil characteristic at each of the selected positions; comparing the determined soil characteristics to a subsurface soil characteristic reference profile associated with the Soil Map Unit to determine an overall correlation between the soil characteristic reference profile and the depth-referenced soil characteristics of the selected positions; and deciding whether to deploy a subsurface tool to determine depth-referenced soil characteristics at another position within the Soil Map Unit by considering the overall correlation.

In some embodiments, the initial number of positions selected for tool deployment is also determined as a function of known Soil Map Unit topographical information, land use information, past agricultural yield information, or other available data. The initial number of positions may be selected automatically, such as by the data acquisition system, and yet modified by user input before tool deployment.

Another aspect of the invention features a method of characterizing subsurface properties of a field. The method includes moving a test platform to the field, the test platform having a tool deployment ram for advancing a probe into topsoil of the field at selected locations while receiving signals back from the probe indicating a subsurface material characteristic; moving the test platform to multiple points along a boundary of the field to define a field perimeter; connecting the test platform to a remote network server over a wireless data link; uploading a reference map segment data request from the test platform to the remote network server, the request including a representation of the defined field perimeter; receiving a reference map segment data packet from the remote network server over the wireless data link, the data packet including a segmented portion of a reference map database covering a geographic area containing the field, with the segmented portion being of extent and location as selected at the remote network server in response to the map segment data request uploaded from the test platform; advancing the probe into the topsoil at a first selected location within the field; recording subsurface material characteristic data received from the advancing probe; and evaluating the recorded material characteristic data by comparing the recorded subsurface material characteristic data with data from the reference map segment data packet.

In some embodiments, the reference map segment data request also includes an indication of an intended use of data obtained by characterizing the subsurface properties. Based on this indication, the remote network server may filter the information to be included in the reference map segment data packet.

In some cases, the wireless data link includes an intermediate server disposed outside the field. In such cases, the intermediate server receives and interprets the reference map segment data request; selects, in response to the request, among particular network map data servers; downloads from each selected server a segmented portion of an associated reference map database; generates the reference map segment data packet; and then downloads the reference map segment data packet to the test platform.

In some embodiments the method includes, after recording subsurface material characteristic data received from the advancing probe, determining further test activity to be performed within the field as a finction of the received data at the first selected location.

Other aspects of the invention feature systems, apparatus and computing systems configured to perform the above methods, data analysis, integration and transfer.

Various aspects of the invention can greatly improve in-field subsurface surveying efficiency over present methods. By building directly upon pre-existing subsurface and other survey data, for example, in-field testing time can be reduced. Further, such techniques offer particular advantage when test planning, reference data integration, sensor data collection and analysis are performed on-the-fly while the test platform is on site, in many cases in the course of a single day. In the United States these methods can take particular advantage of readily available USDA-NRCS Soil Surveys as part of the initial reference data for test planning. Standard computing platforms may be programmed to perform many aspects of these methods in semi-automated fashion, with overall test planning and coordination provided remotely by a trained scientist, and all in-field testing performed by a field operator following simple directions, making better use of human resources. The user is also able to integrate real-time sensor data with pre-existing data for a chosen site, thus increasing sampling strategy flexibility as the site is characterized. An on-the-fly material sampling routine can be advantageously integrated with the data acquisition methods described herein. Various aspects of the invention are particularly useful for precision applications, economically producing the survey information needed for precision agriculture, wetland mapping, construction, watershed evaluation, golf course design maintenance, etc.

The details of one or more embodiments of the invention are set forth in the accompanying drawings and the description below. Other features, objects, and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION OF THE INVENTION

Figure 1:
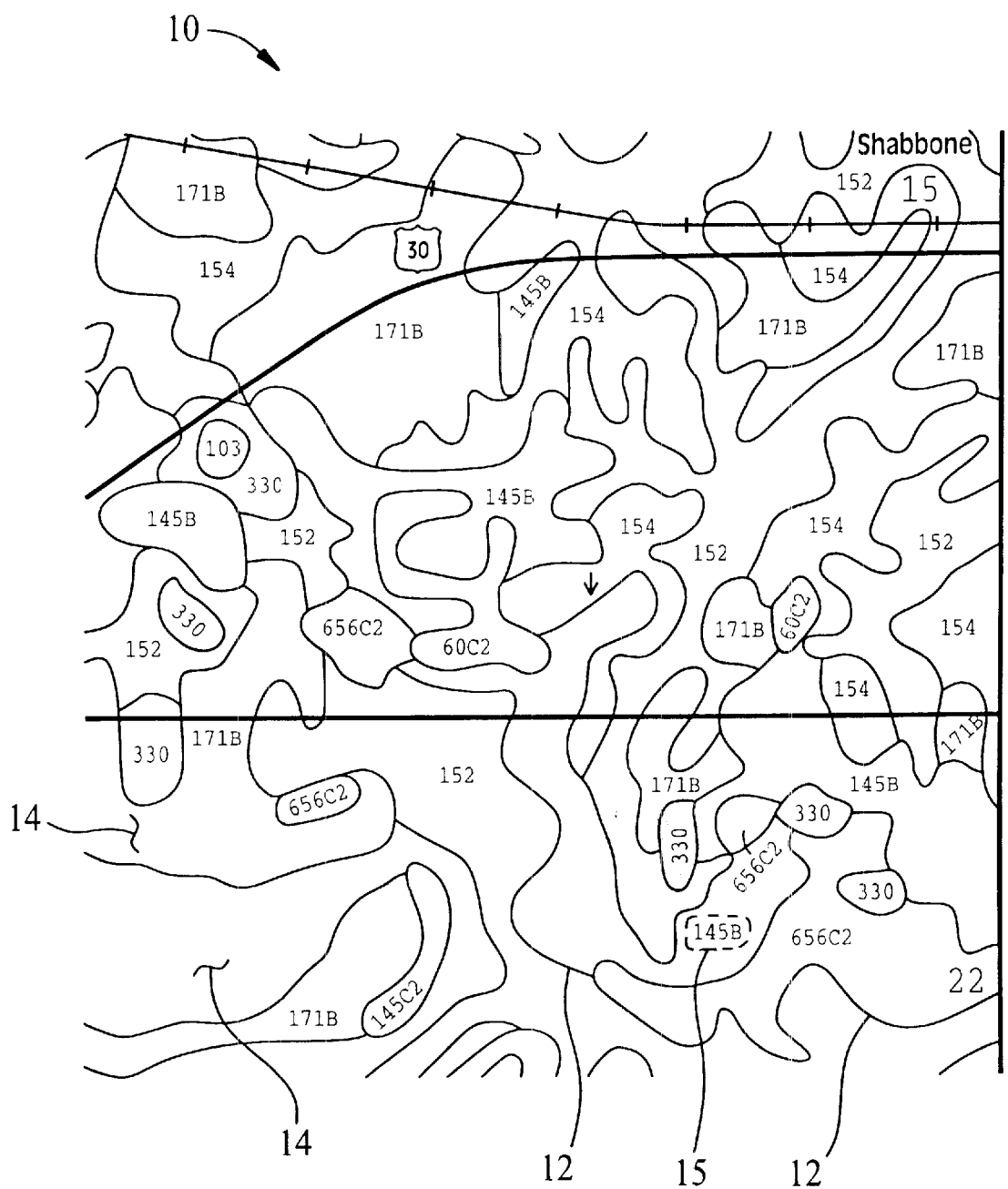
FIG. 1 is an air photo overlaid with USDA-NRCS soil map unit polygons.

Referring first to FIG. 1, soil topology information is shown in air photo 10 overlaid with closed boundaries or polygons 12 each enclosing a geographic region 14 or "soil map unit" labeled with a number corresponding to a specific subsurface material characteristic reference profile identified in a USDA-NRCS Soil Survey as a soil series description. In this illustrated example covering approximately 1000 acres, there are several polygons 12, each of which bounds a numbered soil map unit 14. As the numeric label 15 of the soil map unit corresponds to a particular characteristic soil type and profile, many soil map units in this field have identical labels. As shown, the polygons are of irregular shape as determined by local topology and rough sampling at the time of the survey.

Figure 2:
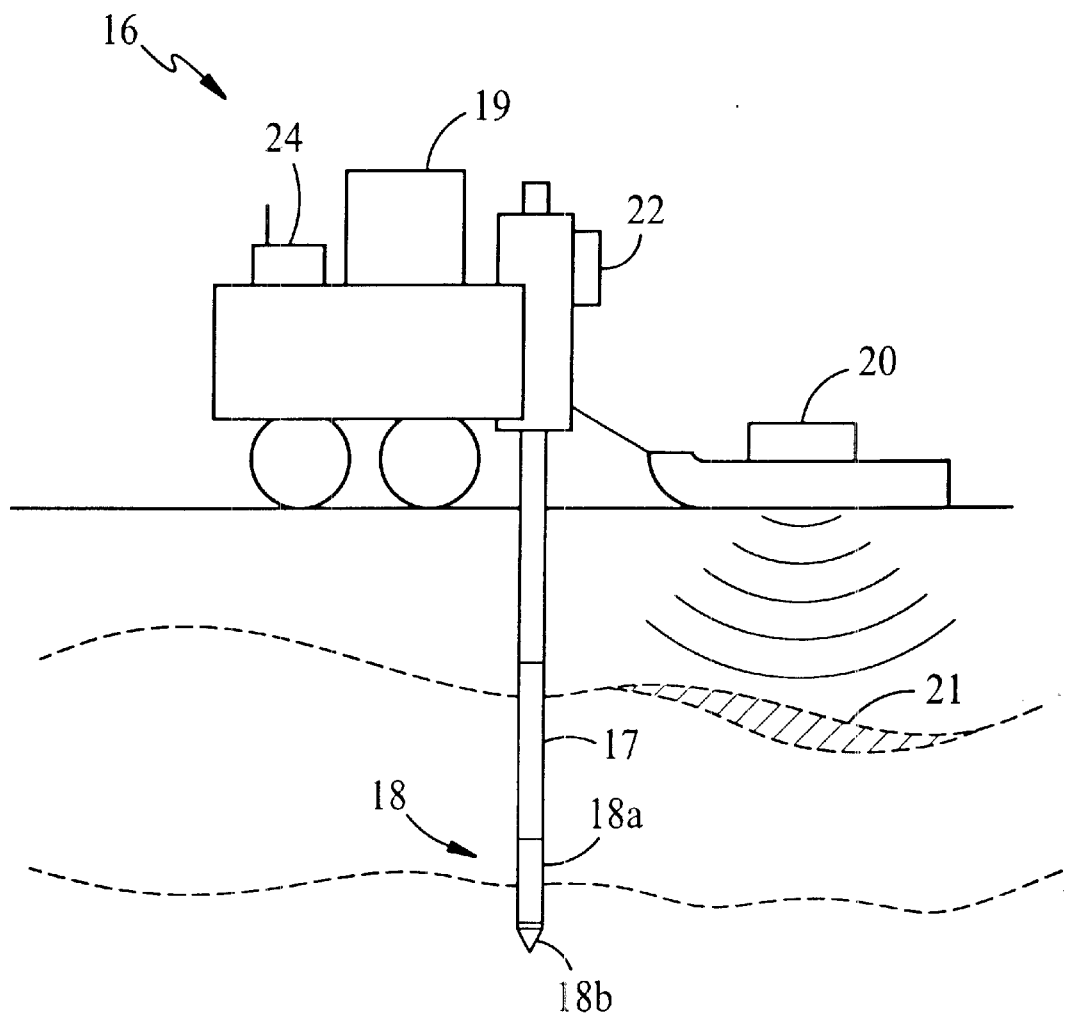
FIG. 2 illustrates field data acquisition with a mobile test vehicle.

FIG. 2 illustrates a test vehicle 16 adapted to collect in-field subsurface and available data for the site. Vehicle 16 includes a push system for pushing cone penetrometer (CPT) probes 17 or other invasive sensors into the soil along a selected path, either vertical or angled. These probes contain sensors 18, known in the art, that are responsive to various soil properties. A typical CPT probe configured for geotechnical surveys may contain a tip force load cell 18$b$ and a sleeve friction load cell 18$a$,for example, along with a pore pressure sensor. In many cases, signals from such sensors are relayed electrically or wirelessly up to the push vehicle 16 for logging and analysis. Penetrometer sensors can be used to measure or derive soil compaction, grain size, color, organic matter content, moisture, temperature and resistivity, as well as other chemical and physical properties. Some such sensors are available from Environmental Sensors, Inc. of Vancouver, British Columbia. In addition to these subsurface-deployed sensors, vehicle 16 is equipped with non-invasive sensors 20 for obtaining real-time subsurface images without disturbing the soil. Sensors 20 may include electromagnetic and ground penetrating radar sensors, for example, capable of detecting subsurface structures such as clay lenses 21 and inter-layer boundaries. A data acquisition system 19 on-board vehicle 16 collects data from deployed sensors 18 and 20, with data from in-ground sensors correlated with depth as determined from a depth gage 22, and all data correlated with geographic position as determined by an on-board global positioning system (GPS) 24. The on-board data acquisition system is also capable of integrating data collected from sensors with pre-existing data for the site, and/or relaying raw or processed data off-site via mobile telecommunications link.

Figure 3:
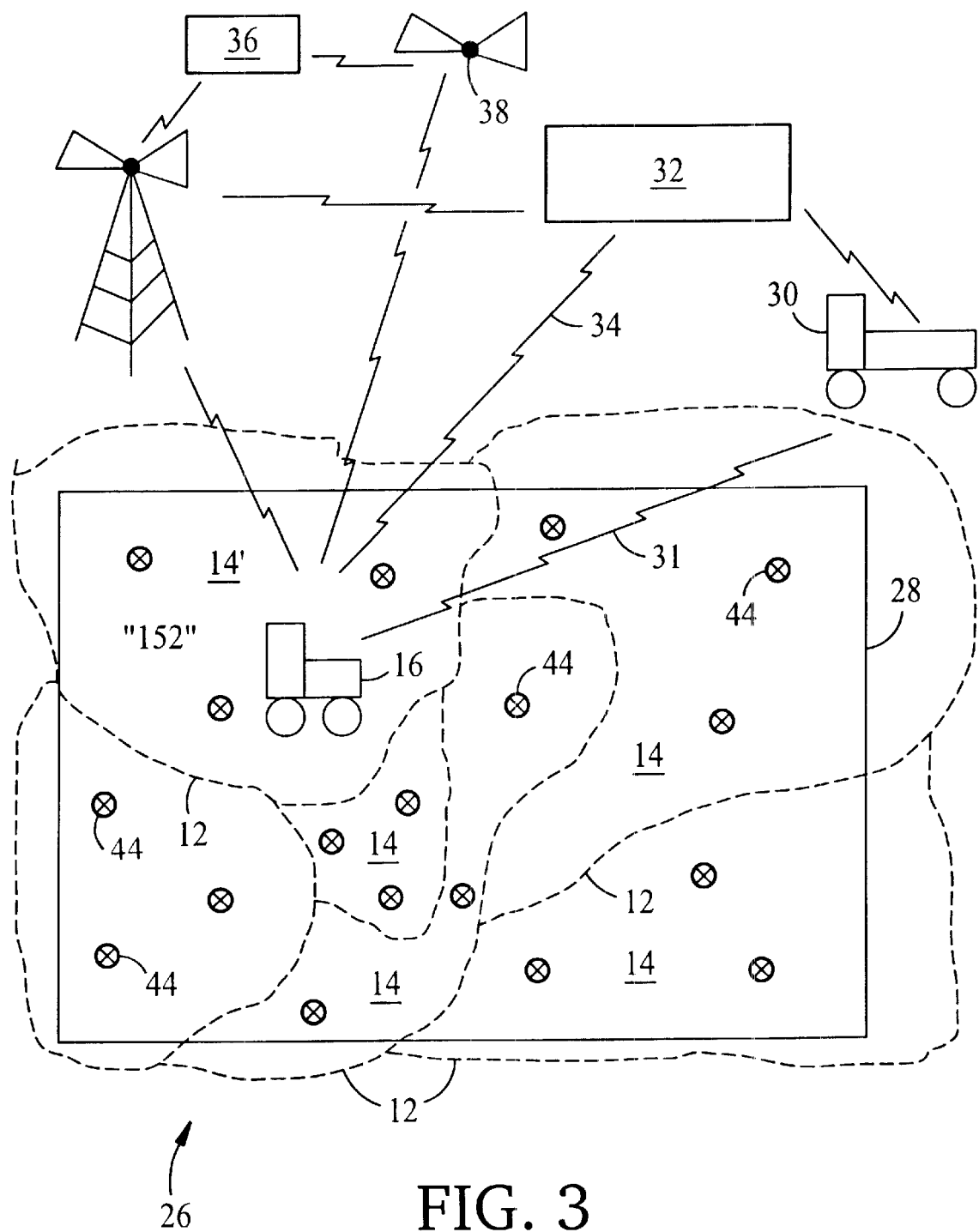
FIG. 3 schematically illustrates the acquisition of available data for a particular field.

Referring to FIG. 3, vehicle 16 is deployed in a field 26 to be accurately mapped with respect to subsurface characteristics. The illustrated field boundary 28 encloses portions of several different soil map units 14 identified on a related soil survey, with each soil map unit having a numeric label (only label "152" for soil map unit 14' shown) that identifies the soil map unit as corresponding to a particular soil series.

Upon first arriving at field 26, the field operator responsible for mapping the site will preferably already have access to any data that exists for the site, including USDA-NRCS soil surveys and previously acquired data. This data can be stored in an on-board computer on test vehicle 16, stored just outside the field boundary such as on a support vehicle 30 and sent to test vehicle 16 as needed via wireless communication 31, or downloaded from a remote computer 32 using an Internet link 34 or radio transmission, for example. In some cases, test vehicle 16 has an on-board wireless modem or satellite transceiver for establishing a direct telecommunications link between the test vehicle data acquisition system and the remote databases 36, such as via the Internet. Relaying the geographic position of test vehicle 16 as determined by the GPS device located on or near the test vehicle that determines its location using a series of global positioning satellites 38 in orbit about the earth, remote computer 32 requests pre-existing field data from various established databases 36. This data can include, for example, NRCS Soil Surveys or other soil maps, crop yield, digital elevation models, satellite images, air photos, orthorectified air photos, geology surveys, soil and water test information, land use records and history, and field and property boundaries. In some cases the field boundary 28 is initially determined on-site by initially driving test vehicle 16 around the area to be mapped while recording boundary marks with the GPS system. The available data is then compiled using software contained either on test vehicle 16, field support vehicle 30, or from remote computer 32, to form an integrated database reflecting the known information with respect to field 26.

In some cases, more than one test vehicle 16 is deployed in a field at a given time to promote testing and sampling efficiency. The test vehicles may all perform the same types of tasks, or may each be equipped to perform a specialized task, with all preferably coordinated from a single remote vehicle 30 or computer 32. While the test vehicle may be a wheeled or tracked mobile platform, in some cases it comprises a set of instrumentation and sensors carried about in a backpack or pushed about on a cart or sled by a test operator.

Figure 4:
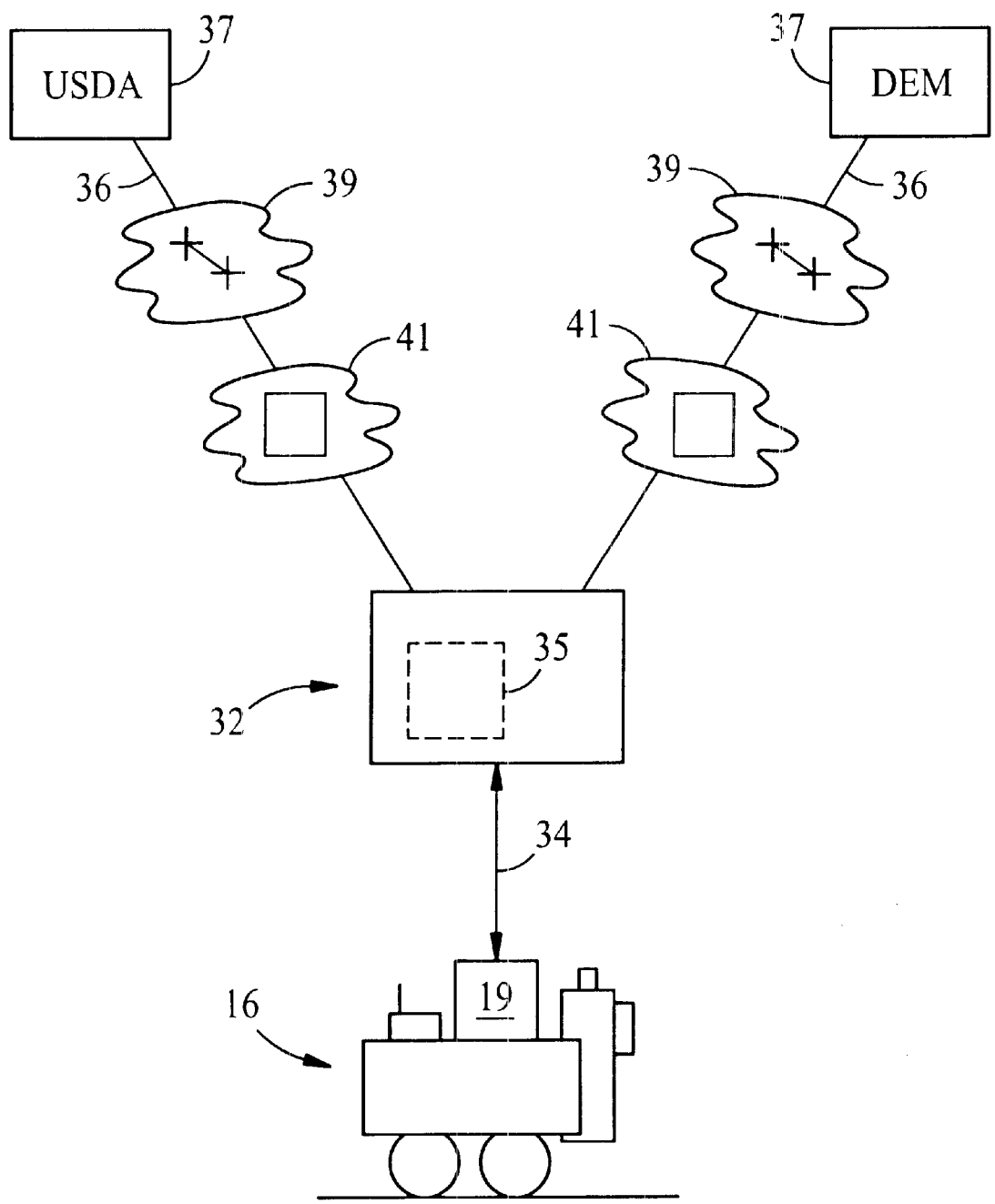
FIG. 4 illustrates integration and transfer of pre-existing data to the test platform from a remote data facility.

Referring to FIG. 4, a significant part of an efficient process of refining or improving the soil map of field 26 is collecting and integrating the pre-existing data from various accessible sources. Because such data is represented in different formats, with different coordinate systems, the integration of such data requires precise translation and overlay. One of the functions of the remote computer 32 (or in some cases, the computers on the test vehicle 26 or field support vehicle 30) is to translate all of the data from the different databases (located, for example, on government and private servers all around the country) into a preferred coordinate system of the field. The USDA soil survey polygons were originally referenced to each state's coordinate reference system. Therefore, polygon locations are ideally shifted during integration to account for transformation from the original aerial maps to GPS geo-referenced digital polygon maps.

USDA soil surveys and other database information tends to be stored in massive files that are cumbersome to download repeatedly to the field. Therefore, it is preferred that the field boundary be employed to crop the available database information down to only that portion corresponding to the field in question, prior to transfer of such data to the field operator. This "clip and ship" approach requires either the involvement of a remote coordination facility with sufficient computer resources to perform such data cropping remotely, or a database interface that permits precise boundary limitations in the transfer request. Either way, this approach enables huge amounts of data, some of which is in the form of images, to be more easily transferred to the field. In one example application, the field operator in the test vehicle 16 transmits field boundary and needed data type information to remote computer facility 32, which crops data already downloaded from various web servers for the general area, integrates such data with reference to a field-specific coordinate system, and then forwards the cropped, integrated data packet 35 to the field operator in a manner of minutes or while the field operator is busily setting up the subsurface data acquisition equipment for a first push. In the process as illustrated, the central processing facility receives pre-existing data, such as USDA soil polygon maps and digital elevation models, from several sources 37, shifts 39 the coordinate references as necessary to enable overlay, crops 41 the portion of the pre-existing data files corresponding to the test area, and then overlays all of the processed, pre-existing data files to create a single database 35 limited to only that information necessary to the instant project. Only two remote data providers are shown for purposes of illustration, but any given project may require integration of many more sources of site-specific information, such as crop yield maps, orthophotos, property line boundaries, buried utility maps, available precision agriculture landscape models, etc. This process can greatly reduce the amount of forward planning necessary to begin testing, as an operator may just proceed to a field, drive around the field to establish a digital boundary, and electronically request the compilation and transfer of a relevant data package for that location. In contrast, many earlier approaches require a sampling plan to be made several days in advance if prior digital information layers are to be used, so that the data from all the different databases can be obtained and integrated. The types of data to be integrated is preferably selected in response to an indication of the type of survey to be conducted, reducing the level of training and scientific knowledge necessary for in-field operators, particularly when a remote data analysis facility is employed.

Figure 5:
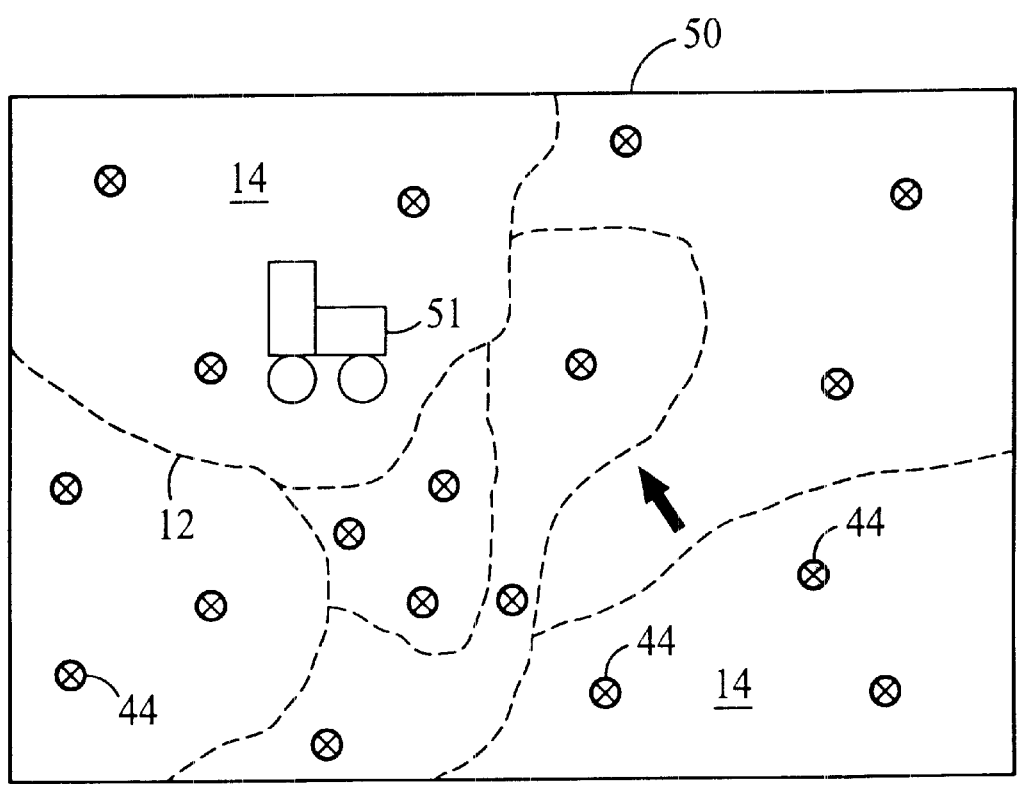
FIG. 5 shows a representative on-board display of the field, showing the location of the test vehicle and initial test locations within each identified soil map unit.

In one example field data acquisition method, the field operator in test vehicle 16 will immediately proceed to collect in situ subsurface data at selected locations within each soil map unit identified within the integrated data packet containing the USDA-NRCS polygons. An on-board display 50 of the USDA-NRCS polygon map of the field (FIG. 5) may be continuously updated with an icon 51 displaying the precise location of the test vehicle 16 as an aid to positioning the vehicle for data collection. Initial test locations 44 for each soil map unit 14 are also preferably shown on the display. For 3-D data manipulation, three initial test locations 44 are automatically generated for each soil map unit. The suggested position of each initial test location 44 is established geometrically to span the general area of the soil map unit, modified as needed to provide reasonable distance between initial test locations 44 in neighboring soil map units. If desired, the in-field operator is given authority to move any initial test location, such as by "clicking and dragging" the location icon 44 with a cursor control device, due to in-field accessibility, terrain variations, or subjective considerations.

Figure 6:
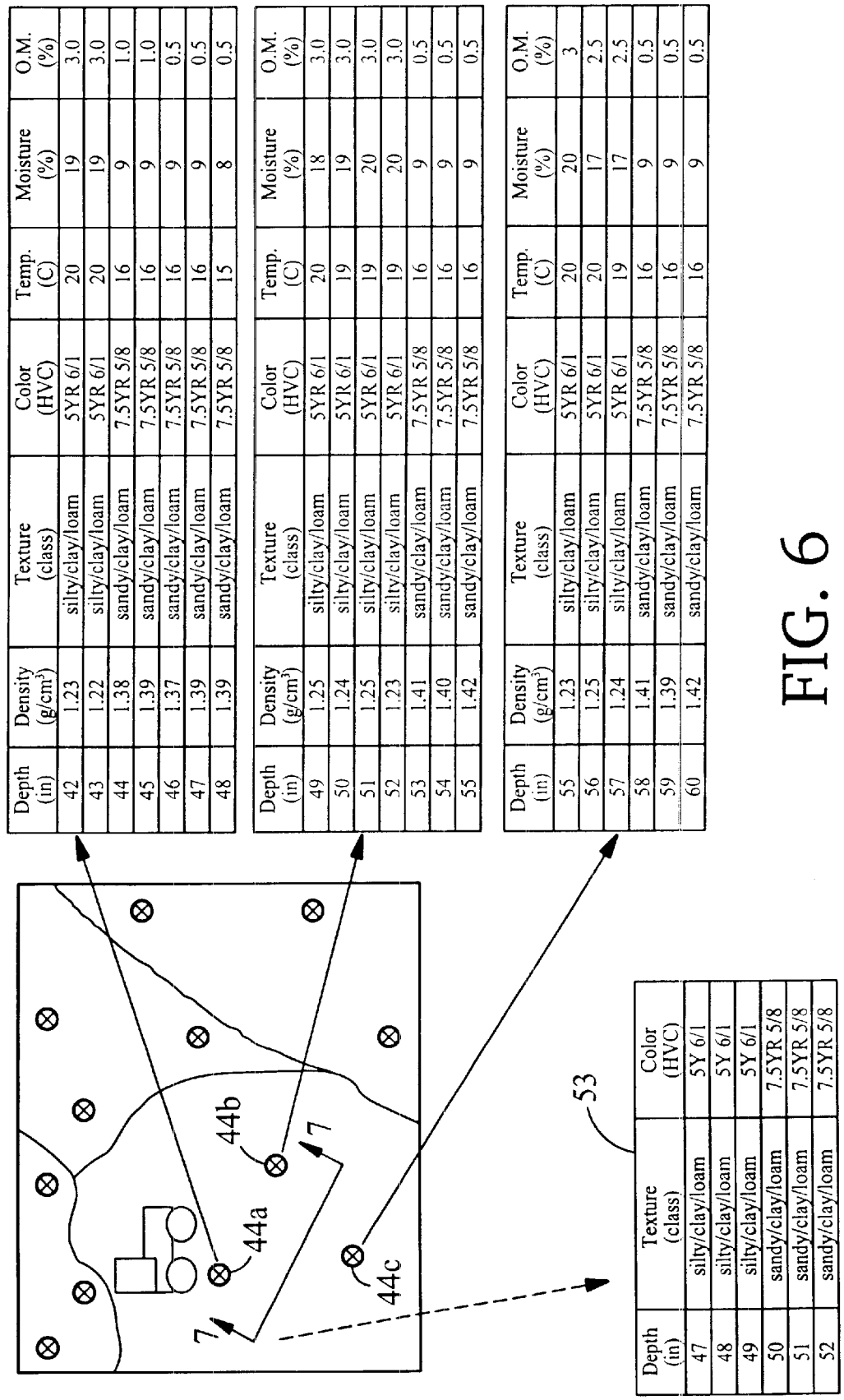
FIG. 6 shows partial log results from three initial test locations within a soil map unit, along with a partial reference log derived from the USDA soil survey.

In general, data should be collected at all three initial test locations 44 for a given soil map unit 14 before moving on to another soil map unit. FIG. 6 shows representative acquired and derived soil properties over relevant depth spans across a soil layer boundary at each of three initial test locations 44a, 44b and 44c in a soil map unit, along with soil texture and color data 53 derived directly from the representative soil horizon and content information contained within the USDA-NRCS soil survey for the soil series corresponding to that soil map unit. For purposes of illustration, this reference data corresponds to the Drummer Series USDA-NRCS log information reproduced above. The data shown in this figure may also be represented graphically as logs of any particular property as a function of depth. As can be seen in this instance, each test concurs with the USDA-NRCS representative log with respect to the existence of both a silty/loam layer and a sandy/loam layer within this general depth, but indicate that the actual depth of the transition between these layers varies between 44 inches at point 44a and 58 inches at point 44b.

Figure 7:
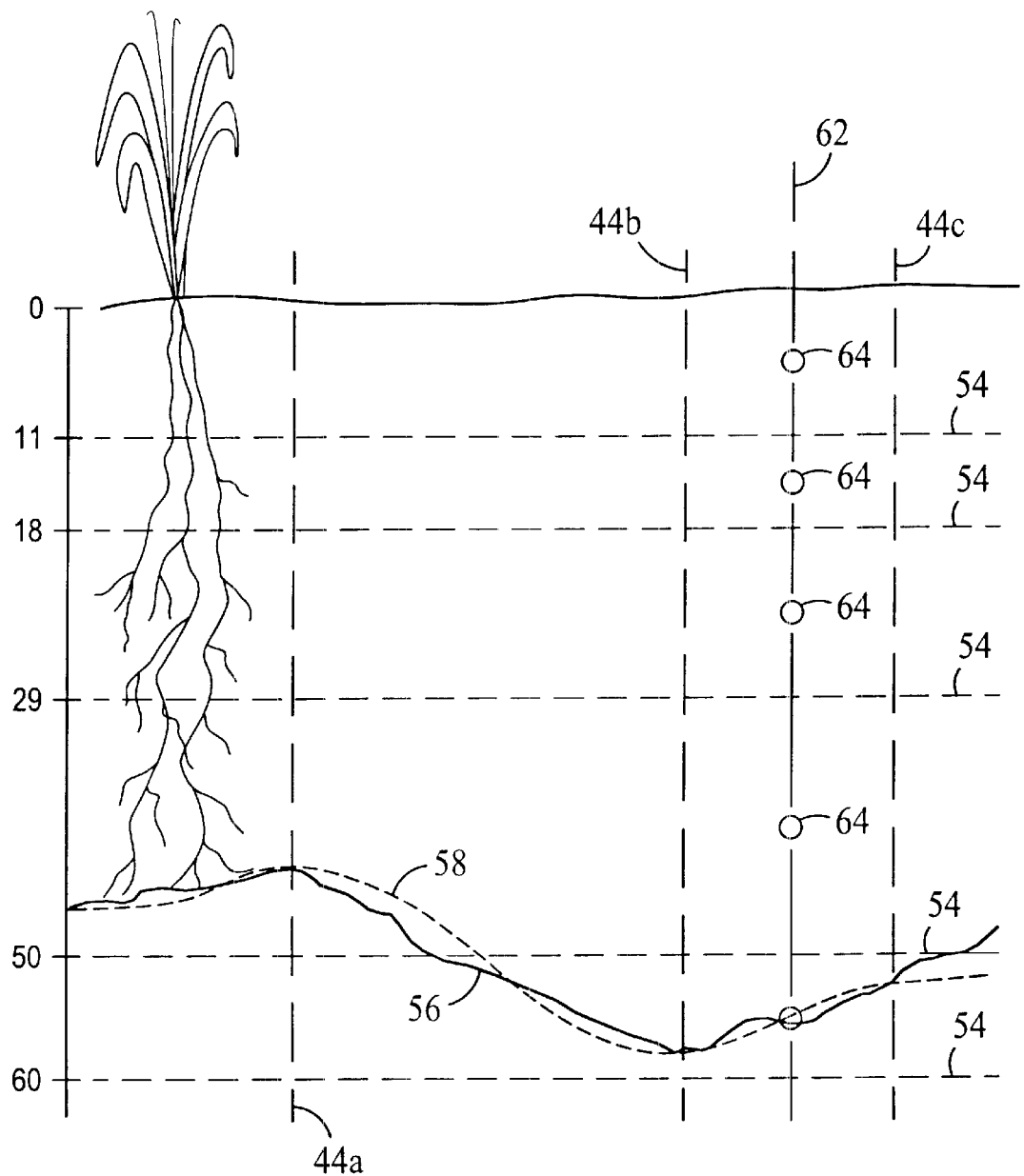
FIG. 7 is a cross-sectional subsurface view, taken along line 7—7 in FIG. 6.

This variation can better be visualized in the laterally compressed subsurface cross-section of FIG. 7. The predicted boundaries 54 between soil layers predicted by the USDA-NRCS reference data can only be represented as parallel, horizontal lines as the entire soil map unit is characterized with but a single representative log. The actual location of the boundary 56 between the E and F horizons, predicted by the pre-existing data to be at an average depth of 50 inches, is shown to vary across the soil map unit. This variance is significant in this agricultural example, as this layer boundary establishes a sharp delineation between the moisture-carrying, organically rich silt layer above and the dry, sandy layer below. Given this variability in depth for a particularly important feature, additional testing may very well be required before the confidence level in the surmised location of this feature is acceptable.

If the corroboration between the soil characteristics determined at each of these three data collection locations exceeds the necessary confidence threshold, the test algorithm will suggest moving on to the next soil map unit and will create a preliminary 3-D model of the boundaries between these layers across the soil map unit. With no edge constraints imposed from neighboring soil map units, such a model will be planar with only three data points. However, as data is collected at points in neighboring soil map units, the model will be adjusted with proper higher order curvature, such as through punctual, three-dimensional Kriging methods, to best match the known data, and the mathematical confidence level will increase as the standard error of the Kriging estimation procedure decreases. If there is low soil data correlation between the three initial test locations (e.g., if the Kriging estimation variance is above a predetermined acceptability level), the algorithm will recommend a fourth initial test location before moving on to other soil map units. Known sampling routine algorithms can be employed to determine a geo-statistically efficient location for each successive data collection point 44. Optimal Kriging weights, those that produce a minimum estimation variance, are obtained by solving a set of simultaneous equations as known in the art. The suggested location of the fourth test location will be determined mathematically, based on the locations of the first three test locations and the degree of variability between each combination of two of the first three test locations. Additional test locations will be established within the soil map unit until the desired level of confidence is obtained with respect to mapping the layer boundaries. A representative, smooth approximation 58 of the location of actual boundary 56 generated through three-dimensional Kriging with sufficient data points is shown in dashed outline to illustrate the substantial improvement in accuracy derived from this technique that builds upon the initial USDA-NRCS reference data. For purpose of illustration, the actual locations of other soil layer boundaries are omitted from this view.

In one preferred approach the number of initial test locations established by the algorithm is a function of the standard soil map unit (SMU) inclusion percentage (an estimate of non-homogeneity) established by the USDA. For example, only three initial tests will be suggested when the inclusion percentage is reported as less than 10. An inclusion percentage of between 10 and 20 will prompt four initial test locations, with five initial test locations for 20–30, six for 30–40, and seven for any inclusion percentage greater than 40. As with the above example, additional test locations may be requested as a function of data correlation during testing.

As seen from the representative data of FIG. 6, not only are soil color data produced and soil texture data derived in the field for direct comparison with USDA-NRCS representative soil log data, but soil density, temperature, moisture and organic matter content are measured or derived. As would be expected, both the moisture and organic matter (O.M.) econtent decrease significantly in the sandy/loam layer, the beginning of which is also indicated by the shift in soil color and density. Thus, not only may the on-board algorithm or remote data processing service now provide a good three-dimensional model of soil layer boundaries, it may also provide information as to the capacity of the soil to retain or accept water and fertilizers, thus enabling very precise application of each for agricultural or other uses, or precise crop planning and planting. Available software products for performing general geostatistical and graphical analysis of subsurface data include EnviroStats, available from Scientific Software Group of Washington, D.C.

Figure 8:
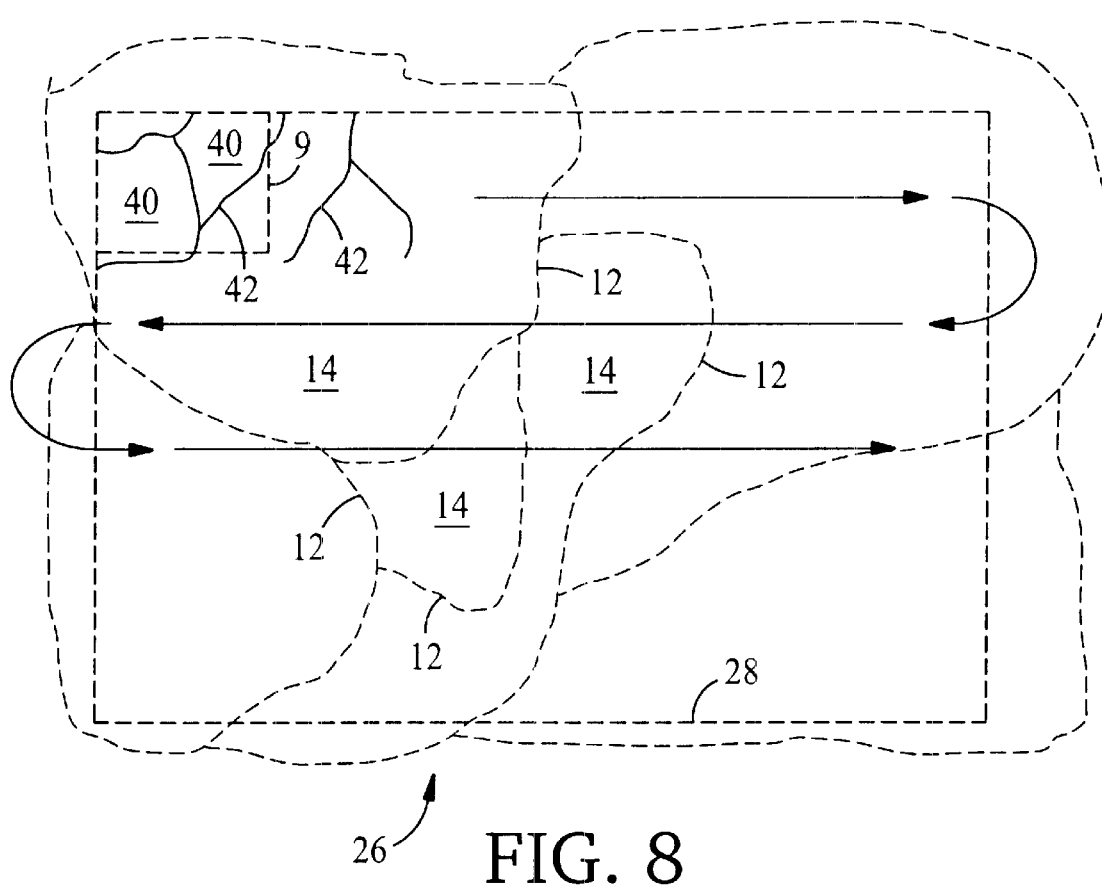
FIG. 8 illustrates the traversal of the field with non-invasive sensors to map more refined soil zones.
Figure 9:
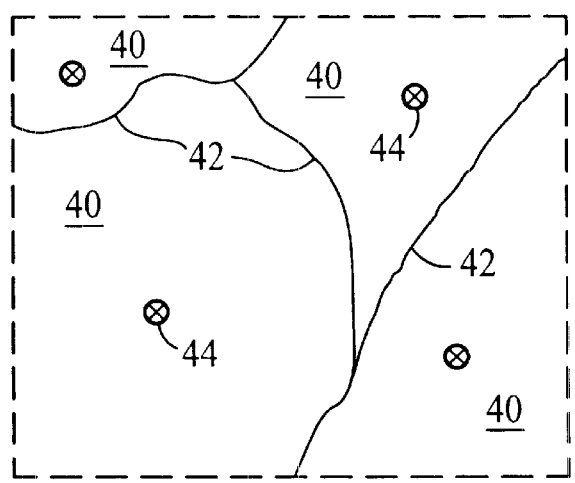
FIG. 9 is an enlarged view of area 9 of FIG. 8, showing initial test locations for each soil zone.

In another mapping scenario, once the field boundary 28 is defined, the test vehicle begins traversing the field in a predetermined pattern as shown by arrows in FIG. 8, in order to obtain a high-resolution Digital Elevation Model (DEM). The DEM is created by obtaining landscape position and elevation as discrete GPS measurements as the vehicle moves across field 26. The precise DEM is compared to a macro DEM from the United States Geographical Service (USGS) included in the downloaded data packet, with any gross variations prompting confirmation. In addition, test vehicle carries sensors that non-invasively detect changes in soil properties as the test vehicle moves across the field, such as electromagnetic or ground penetrating radar. These non-invasive sensors can often detect more detailed changes in soil properties than those delineated in typical USDA-NRCS soil survey maps, enabling the real-time derivation of more precise soil zones 40 with their own set of boundaries 42, within a given soil map unit 14 and even extending across soil map unit boundaries 12. This process can precede, or occur during, the remote acquisition and integration of pre-existing data described above. Initial test locations may then be established in each soil zone 40, rather than in each USDA-NRCS soil map unit, as described above. However, the establishment of such soil zones 40 as a result of broad, non-intrusive testing can enable the selection of only a single intrusive test location 44 per soil zone 40 as shown in FIG. 9, for many applications, with reasonable confidence that the data from that test location will be sufficiently representative of the entire soil zone.

The precise DEM enables proper transposition of subsurface data depth references to a common reference plane, such that fully three-dimensional subsurface models may be generated and sectioned for viewing. For some applications, a rough DEM as available from the USGS may be sufficient for this purpose, but for many precision applications a more exact depth reference will be desired. In some cases, it will be sufficient to simply reference the depth index of each subsurface log to a discrete GPS elevation measurement taken at the respective test location.

There are a variety of invasive sensors that can be pushed through the upper layers of soil with a relatively light-weight push platform without extended damage to sensitive topsoils. Standard cone penetrometers, of about 1.5 to 2.0 inch diameter, will be useful for some applications while obtaining standard geotechnical measurements of tip force and sleeve friction, but many sensors have been sufficiently miniaturized to fit within a much smaller probe, such as of about one inch or less in diameter. These sensors can include, among others, a miniature light source and receiver that together operate as a video camera to provide digital images of the soil surrounding the probe as it is advanced at a constant rate of 0.5 centimeters per second, for example. Such digital images can be particularly useful for subjective evaluation by skilled geologists thousands of miles from the test site, even before the probe is removed from the ground. It is also recommended that a full in situ video log be taken in each critical soil management zone at the end of the mapping sequence, for future reference. Such logs may eventually be cataloged and publicly accessible through NRCS, for example. In situ camera and video services are available commercially from Earth Information Technologies of Madison, Wis. among others.

If there is more than one test vehicle 16 at the site, the process of mapping individual soil zones 40 with penetrometer sensors can begin once the non-invasive sensors and any pre-existing data define zone boundaries 42, with data acquisition proceeding concurrently in multiple soil zones within the same field. In such cases, it is preferred to have such concurrent activity coordinated from a single chief test platform, or from a remote vehicle or facility, with data from the various acquisition platforms forwarded after each test location in order to update the overall subsurface model and determine the next test location for each rig.

In another example, a 100-acre site is mapped to assess the extent of a known wetland before construction can begin on a planned shopping mall. The Army Corps of Engineers presently requires that in order for a location to be considered a wetland, it must contain a hydric soil. The soil properties that are relevant to a hydric soil are: depth to water, permeability, soil layer depth, soil color, soil structure, soil texture, and redoximorphic features. A test vehicle is mobilized to the site and immediately begins delineating the boundaries of the site by traversing the periphery. In addition, any other features significant to the site (e.g., trees, boulders, ponds, marshes, concrete) also have their boundaries delineated. During the boundary mapping process a request is sent by the field data acquisition system to either an on-board database or a data server via a telecommunications link, requesting all available pertinent information (soil maps, DEMs, air photos, satellite images, water or soil sample data, or other maps and features) for that site. Once all relevant data is compiled and the boundaries delineated, the portions of the compiled data that are specifically relevant to the site boundaries are clipped out of the compiled data. If the data clipping is performed at a remote location or otherwise away from the field test vehicle, then the clipped data is shipped to the field data acquisition system.

Once all site-specific and relevant data is acquired, the test vehicle is robotically or manually driven across the site to obtain high-resolution positional data as well as an assessment of soil zones defined between locations where significant subsurface property changes occur (i.e., at zone boundaries). During or after the "clip and ship" process the field data acquisition system combines the real-time DEM and soil data collected with the previously available data to create a map on which many specific zones are depicted. A decision is made by the user as to the sensitivity of the instrumentation output analysis so as to not "over delineate" the site. This decision is made in terms of the specifics of the site as well as the intended use for the newly created soil and topography map.

Geometric and/or statistical sampling algorithms are applied to the newly created map to determine the most efficient and effective location for point sample collection or sensor testing. For example, if six unique zones are delineated, then three locations within each can be digitally flagged in such a way that they are all equidistant from one another and spaced with the most possible area of soil zone surrounding them. These digital flag locations are investigated either through sampling and/or sensor testing. The test vehicle is moved to each flagged location, where it obtains subsurface data to a depth of two meters. Each point profile of soil properties relevant to wetland delineation is taken and compared to the other tests conducted in the soil zone, as well as to the predicted soil properties from the non-invasive sensor testing and any pre-existing data for the site. Variability tolerances can be set by the user or statistically determined with respect to the need to take additional sample or test points within the particular soil zone. Once the soil properties are determined for the specific zone, as well as adjacent zones, a three-dimensional soil and topography map is created for each of the soil properties specifically estimated. Once each zone is established, a digital soil video log is collected for each with a soil imaging penetrometer. These images can be sent off-site through a telecommunications link for viewing or processing and/or storage. The digital soil and topography map is exported to the user.

Referring back to FIG. 7, for another application not requiring delineation of soil layer boundaries but only needing precise determination of soil properties within known soil layers, the test vehicle is positioned in a central location 62 within the soil map unit and the test operator proceeds to take soil samples and/or soil property data at discrete locations 64 selected to lie generally at a midpoint of each soil layer identified in the USDA-NRCS soil series description, or in other pre-existing surveys. This approach enables very rapid site assessment, at some cost of accuracy. For example, as can be seen from the location of the lowermost sampling location 64 shown, variation in depth of the soil strata across the zone can result in some sampling missing its intended layer altogether. However, for many applications, and in sites generally having very coarse layer thickness, such an approach can provide much needed information for supplementing pre-existing data. For example, it might be known from the available USDA-NRCS survey that three specific soil types are predicted to exist at the site having relevance to a particular variable rate Nitrogen fertilizer application, separated generally by boundaries at 12 and 48 inches. It may be known that these two soil types differ measurably in texture and color. In this application it might only be necessary, and economically much more efficient, to only characterize these two properties, and only at one point per predicted soil layer in each soil map unit. The landscape surface position of the one test location might be selected near a central region of the soil map unit, or using methodologies such as where greater vertical resolution is required. Once the measurement location is determined, it may only be necessary to determine color and texture at a selected depth within each layer. Data collection depths are either predetermined, such as at each expected layer midpoint, or are established by monitoring signals as probe sensor measure soil properties, but with only the data at two depths actually recorded. In another scenario where the boundary depths are also of interest, only the actual determined location of layer boundary depths, and single point or average property data within each layer, are recorded for analysis. Such limited information is sufficient for some modeling approaches that assume homogenous layer properties.

Given the methods described above, a digital library of SMU data may be developed and continually updated with additional information as it becomes available from recognized service providers. The initial database would include a representative digital profile for each USDA-NRCS soil series, including a unique, associated digital sensory signature. The signature database profiles are preferably collected at least twice under different conditions (e.g., different moisture and temperature) with the same type of sensors, thus enabling the creation of calibration curves and the transferability of results collected using different tools by different operators. When a field boundary is later delineated, a list of potential signatures is downloaded for the mapping procedure as determined by the SMU designations in the area of the USDA-NRCS soil survey associated with the field. Other locally occurring signatures could also be used for the mapping procedure.

Each time a test is performed by the test vehicle, the landscape position is recorded. At the conclusion of the test the coordinates are used to determine from which SMU the data were collected. The signature for the test location is compared to the digital SMU library. In most cases, the newly acquired signature will not exactly match a signature from the library. Therefore, fuzzy logic methods can be employed to determine which SMU signature is most like the newly acquired signature. This type of classification is sometimes referred to as a "fuzzy" map and is often very representative of natural landscapes and can help to better define the boundaries between soil types.

A number of embodiments of the invention have been described. Nevertheless, it will be understood that various modifications may be made without departing from the spirit and scope of the invention. Accordingly, other embodiments are within the scope of the following claims.

What is claimed is:

1. A method of characterizing subsurface conditions in a selected geographic region previously associated as a whole with a specific subsurface material characteristic reference profile, the method comprising
    deploying a sensing tool at a selected position within the geographic region, the tool constructed to be responsive to a selected subsurface material attribute;
    determining, from a signal received from the deployed tool, a depth-referenced subsurface material characteristic at the selected position;
    comparing the determined subsurface material characteristic to the subsurface material characteristic reference profile associated with the geographic region to determine a correlation between the subsurface material characteristic reference profile and the depth-referenced subsurface material characteristic as determined from the signal received from the deployed tool; and then
        deciding whether to deploy the tool at another position within said geographic region by considering the correlation determined from said selected position.

2. The method of claim 1 wherein the geographic region corresponds to one bounded area of a patchwork of such bounded areas on a map, each bounded area having an associated subsurface material characteristic reference profile.

3. The method of claim 2 wherein the geographic region comprises an individual Soil Map Unit as outlined on an USDA-NRCS Soil Survey map and referenced to said subsurface material characteristic reference profile by the USDA-NRCS Soil Survey map.

4. The method of claim 1 wherein the depth-referenced subsurface material characteristic comprises a digital log of a soil property as a function of depth.

5. The method of claim 4 wherein comparing the determined subsurface material characteristic to the subsurface material reference characteristic profile associated with the geographic region includes comparing a soil layer boundary depth, as determined from the soil property log, with a reference layer boundary depth as determined from the subsurface material reference characteristic profile.

6. The method of claim 4 wherein the subsurface material reference characteristic profile comprises a digital reference profile log containing at least about 10 discrete, depth-referenced data points, said correlation comprising a computed numerical value indicative of degree of similarity between the digital soil property log and the digital reference profile log.

7. The method of claim 1 wherein comparing the determined subsurface material characteristic to the subsurface material reference characteristic profile associated with the geographic region includes comparing soil texture at a selected depth, as determined from the determined subsurface material characteristic, with a reference texture as determined from the subsurface material reference characteristic profile.

8. The method of claim 1 wherein deploying the tool includes penetrating soil with the tool to a depth of at least 6 inches.

9. The method of claim 1 wherein deploying the tool includes penetrating soil with the tool to a depth of at least 24 inches.

10. The method of claim 1 further comprising geo-referencing the selected position to a coordinate system with a Global Positioning System.

11. The method of claim 1 wherein the depth-referenced subsurface material characteristic comprises a log of data taken at multiple depths at the selected position.

12. The method of claim 1 wherein the tool is responsive to light reflected from adjacent subsurface material in situ, and wherein determining the depth-referenced subsurface material characteristic includes generating a depth-referenced, rastered image of the subsurface material.

13. The method of claim 12 comprising collecting and digitally processing a series of images of adjacent subsurface materials as the tool is forced through the subsurface materials.

14. The method of claim 1 further comprising
    traversing the geographic region while obtaining landscape position and elevation measurements;
    combining the position and elevation measurements to form a digital elevation model;
    adjusting a depth reference of the subsurface material characteristic determined at each of several test locations in accordance with the digital elevation model; and then
        combining the depth reference-adjusted subsurface material characteristics to form a three-dimensional subsurface model of the material characteristic.

15. The method of claim 1 wherein the depth-referenced subsurface material characteristic comprises multiple, discrete data points obtained at selected depths at the selected position.

16. The method of claim 15 wherein the selected depths are chosen to correspond to soil layers identified in the subsurface material characteristic reference profile associated with the geographic region.

17. The method of claim 15 wherein the discrete data points are spaced apart in elevation according to soil layer thickness included in the subsurface material characteristic reference profile.

18. A method of characterizing subsurface conditions in a selected geographic region previously associated as a whole with a specific subsurface soil characteristic reference profile, the method comprising
    deploying a soil attribute sensing tool at a selected position within the geographic region;
    determining, from a signal received from the deployed tool, a depth-referenced soil characteristic at the selected position;

comparing the determined soil characteristic to the subsurface soil characteristic reference profile associated with the geographic region to determine a correlation between the soil characteristic reference profile and the depth-referenced soil characteristic as determined from the signal received from the deployed tool; and selecting a next tool deployment location within the selected geographic region on a basis of said correlation.

19. The method of claim 18 further comprising deploying a subsurface tool at said next tool deployment location;

determining, from a signal received from the deployed subsurface tool, a second depth-referenced soil characteristic;

comparing said second depth-referenced soil characteristic to the subsurface soil characteristic profile associated with the geographic region to determine another correlation, between the soil characteristic reference profile and the second depth-referenced soil characteristic; and selecting a third tool deployment location within the selected geographic region on a basis of both determined correlations.

20. The method of claim 18 wherein the geographic region corresponds to one bounded area of a patchwork of such bounded areas on a map, each bounded area having an associated subsurface material characteristic reference profile.

21. The method of claim 20 wherein the geographic region comprises an individual Soil Map Unit as outlined on an USDA-NRCS Soil Survey map and referenced to said subsurface material characteristic reference profile by the USDA-NRCS Soil Survey map.

22. The method of claim 18 wherein the depth-referenced subsurface material characteristic comprises a digital log of a soil property as a function of depth.

23. The method of claim 22 wherein comparing the determined subsurface material characteristic to the subsurface material reference characteristic profile associated with the geographic region includes comparing a soil layer boundary depth, as determined from the soil property log, with a reference layer boundary depth as determined from the subsurface material reference characteristic profile.

24. The method of claim 22 wherein the subsurface material reference characteristic profile comprises a digital reference profile log containing at least about 10 discrete, depth-referenced data points, said correlation comprising a computed numerical value indicative of degree of similarity between the digital soil property log and the digital reference profile log.

25. The method of claim 18 wherein the soil attribute sensing tool is deployed in at least three initial positions within the geographic region, to determine a depth-referenced soil characteristic at each of the initial positions, and wherein the step of comparing includes comparing the determined soil characteristics to each other and to the subsurface soil characteristic reference profile associated with the geographic region to determine a correlation between the depth-referenced soil characteristics at the initial positions, and between the depth-referenced soil characteristics and the soil characteristic reference profile.

26. The method of claim 25 wherein the next tool deployment location within the selected geographic region is selected on a basis of the correlation between the depth-referenced soil characteristics at the initial positions.

27. The method of claim 18 including generating a three-dimensional model of the soil characteristic from depth-referenced soil characteristics obtained at multiple positions within the geographic region.

28. The method of claim 27 further including updating the three-dimensional model as data is generated at additional locations within the geographic region.

29. The method of claim 27 wherein the three-dimensional model is created digitally using punctual Kriging estimation techniques.

30. The method of claim 18 wherein comparing the determined subsurface material characteristic to the subsurface material reference characteristic profile associated with the geographic region includes comparing soil texture at a selected depth, as determined from the determined subsurface material characteristic, with a reference texture as determined from the subsurface material reference characteristic profile.

31. The method of claim 18 wherein deploying the tool includes penetrating soil with the tool to a depth of at least 6 inches.

32. The method of claim 18 wherein the depth-referenced subsurface material characteristic comprises a log of data taken at multiple depths at the selected position.

33. The method of claim 18 further comprising traversing the geographic region while obtaining landscape position and elevation measurements;

combining the position and elevation measurements to form a digital elevation model; and adjusting a depth reference of the subsurface material characteristic determined at each of several test locations in accordance with the digital elevation model; and then combining the depth reference-adjusted subsurface material characteristics to form a three-dimensional subsurface model of the material characteristic.

34. The method of claim 18 wherein the depth-referenced subsurface material characteristic comprises multiple, discrete data points obtained at selected depths at the selected position.

35. The method of claim 34 wherein the selected depths are chosen to correspond to soil layers identified in the subsurface material characteristic reference profile associated with the geographic region.

36. The method of claim 34 wherein the discrete data points are spaced apart in elevation according to soil layer thickness included in the subsurface material characteristic reference profile.

37. A method of generating first order survey information in an individual Soil Map Unit as outlined in a map of a USDA-NRCS Soil Survey that establishes an SMU Inclusion Percentage associated with the Soil Map Unit, the method comprising selecting an initial number of positions for tool deployment within the Soil Map Unit, the initial number of selected surface positions being determined as a function of the associated SMU Inclusion Percentage;

deploying a subsurface attribute sensing tool to generate subsurface characteristic logs, based on signals received from the deployed tool, at the selected surface positions;

identifying a soil boundary layer feature common to the generated subsurface characteristic logs; and calculating an expected depth of the soil boundary layer feature at further surface positions within the bounded area as a function of depth of the soil boundary layer feature in the three selected surface positions and a spatial relationship between the selected surface positions and each further surface position.

38. The method of claim 37 further comprising determining, from a signal received from the deployed subsurface tool, a depth-referenced soil characteristic at each of the selected positions;

comparing the determined soil characteristics to a subsurface soil characteristic reference profile associated with the Soil Map Unit to determine an overall correlation between the soil characteristic reference profile and the depth-referenced soil characteristics of the selected positions; and deciding whether to deploy a subsurface tool to determine depth-referenced soil characteristics at another position within said Soil Map Unit by considering said overall correlation.

39. The method of claim 37 wherein the initial number of positions selected for tool deployment is also determined as a function of known Soil Map Unit topographical information.

40. The method of claim 37 wherein the initial number of positions selected for tool deployment is also determined as a function of known land use information.

41. The method of claim 37 wherein the initial number of positions selected for tool deployment is also determined as a function of past agricultural yield information.

42. The method of claim 37 wherein the initial number of positions is selected automatically and modified by user input before tool deployment.

43. A method of characterizing subsurface properties of a field, the method comprising moving a test platform to the field, the test platform having a tool deployment ram for advancing a probe into topsoil of the field at selected locations while receiving signals back from the probe indicating a subsurface material characteristic;

moving the test platform to multiple points along a boundary of the field to define a field perimeter;

connecting the test platform to a remote network server over a wireless data link;

uploading a reference map segment data request from the test platform to the remote network server, the request including a representation of the defined field perimeter;

receiving a reference map segment data packet from the remote network server over the wireless data link, the data packet comprising a segmented portion of a reference map database covering a geographic area containing the field, the segmented portion being of extent and location as selected at the remote network server in response to the map segment data request uploaded from the test platform;

advancing the probe into the topsoil at a first selected location within the field;

recording subsurface material characteristic data received from the advancing probe; and evaluating the recorded material characteristic data by comparing the recorded subsurface material characteristic data with data from the reference map segment data packet.

44. The method of claim 43 wherein the reference map segment data request also includes an indication of an intended use of data obtained by characterizing the subsurface properties.

45. The method of claim 43 wherein the wireless data link includes an intermediate server disposed outside the field, and wherein the intermediate server receives and interprets the reference map segment data request;

selects, in response to the request, among particular network map data servers;

downloads from each selected server a segmented portion of an associated reference map database;

generates said reference map segment data packet; and downloads said reference map segment data packet to the test platform.

46. The method of claim 43 further including, after recording subsurface material characteristic data received from the advancing probe, determining further test activity to be performed within the field as a function of the received data at the first selected location.

* * * * *

UNITED STATES PATENT AND TRADEMARK OFFICE
CERTIFICATE OF CORRECTION

PATENT NO.    : 6,597,992 B2
DATED         : July 22, 2003
INVENTOR(S)   : Daniel James Rooney, Marek Dudka and Mark Andrew Cheyne It is certified that error appears in the above-identified patent and that said Letters Patent is hereby corrected as shown below:

<u>Title page,</u>
Item [*] Notice, replace "9 days" with -- 100 days --;
Item [56], References Cited, U.S. PATENT DOCUMENTS, 4,973,970 A, replace "11/1990" with -- 7/1990 --.

Signed and Sealed this

Sixth Day of April, 2004

JON W. DUDAS
*Acting Director of the United States Patent and Trademark Office*